May 2, 1933.  H. R. GIBBONS  1,907,421
ANTIFRICTION BEARING
Filed April 3, 1928

INVENTOR:
HAROLD R. GIBBONS,
BY
Gales P. Moore
HIS ATTORNEY.

Patented May 2, 1933

1,907,421

UNITED STATES PATENT OFFICE

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE

ANTIFRICTION BEARING

Application filed April 3, 1928. Serial No. 266,928.

This invention relates to antifriction bearings and comprises all the features of novelty herein disclosed in connection with a self-aligning, double-row, roller bearing. An object of the invention is to provide a double row bearing having low production cost and ease of assembly. Another object is to provide an improved self aligning bearing having capabilities of easy handling and mounting by the user. To these ends and to improve generally and in detail upon devices of this character, the invention also consists in the various matters hereinafter described and claimed.

The invention, in its broader aspects, is not necessarily limited to the specific construction selected for illustrative purposes in the accompanying drawing in which Fig. 1 is a transverse central section of the bearing.

Figure 1:
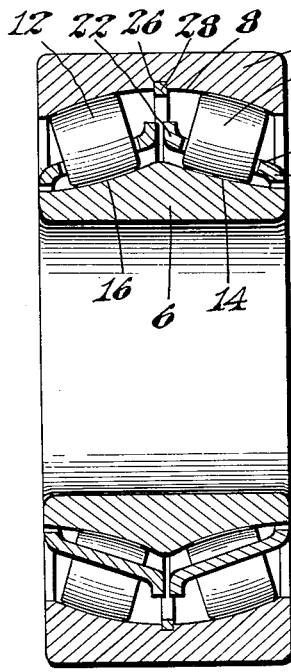
Figure 2:
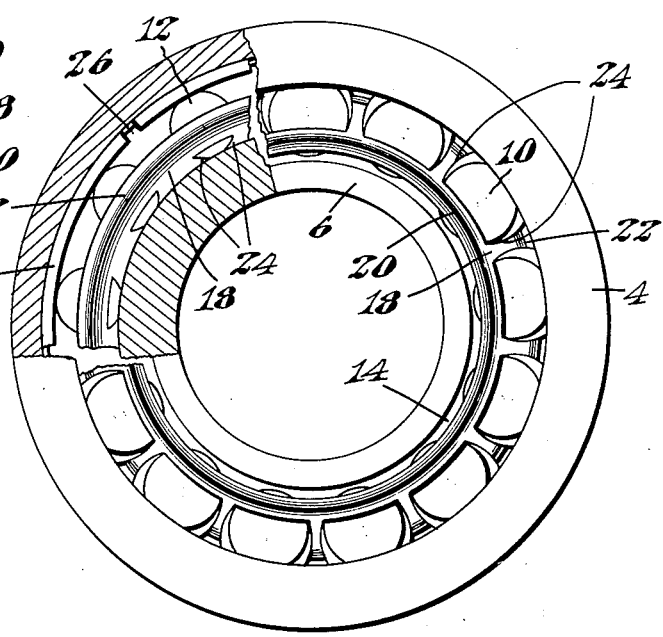
Fig. 2 is a side elevation partly broken away and in section.

The numeral 4 indicates an outer race ring and numeral 6 an inner race ring. One of the rings, preferably the outer, has a raceway surface 8 formed as the equatorial zone of a sphere, the center of curvature preferably being at the geometric center of the race ring. Two rows of rolling elements, 10 and 12, run on separated portions of the spherical raceway. These rolling elements are here shown as of what may be termed the elongated genus (that is, they are not mere balls), and they preferably have a transverse curvature which makes them conform with substantially line contact to the spherical raceway. The inner race ring has oppositely inclined raceways 14 and 16 which have a transverse curvature conforming to the rollers with substantially line contact. The rollers are preferably symmetrical, having a length about equal to the diameter and with rounded corners, and in the illustrated form are barrel-shaped.

A separator and retainer is provided for each row of rollers, and comprises a generally frustro-conical body portion or band 18, an inwardly extending rounded stiffening flange 20 and an outwardly extending rounded stiffening flange 22. The body portion has openings conforming to the rollers and is of such diameter that the front and rear edges 24 of the openings engage the rollers on the opposite side of the circle through the roller axes, from the spherically surfaced race ring. In other words the openings are narrower than the maximum diameter of the rollers so that with the spherically surface race ring displaced, the rollers can be inserted in the openings from the same side of the separator as the spherically surfaced race ring. The spherical surface has a central annular groove 26 for a split spring ring 28 which makes an arcuate projection between the rows of rollers to limit the cocking or tilting of the parts when the bearing is being mounted. This makes for easier handling of the bearing when being mounted and avoids any cocking or tilting sufficient to let the rollers escape from their pockets.

Figure 3:
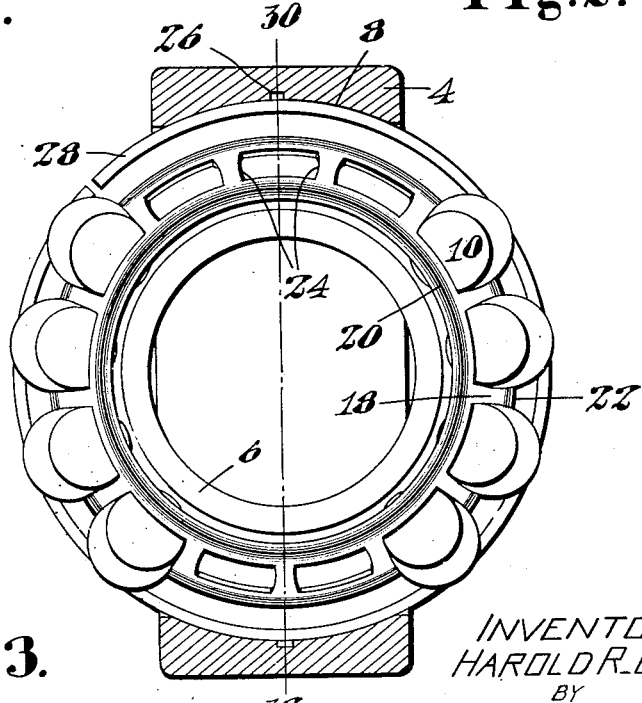
Fig. 3 is a view indicating the method of assembly, part of the bearing being in side elevation and part in section.

In assembling the parts of the illustrated bearing, the inner race ring, both retainers and the split ring are arranged at right angles to the outer race ring as indicated in Fig. 3, the split ring being sprung to make it engage the spherical raceway. The rollers are then inserted in the exposed pockets of the retainers and the separators can be given a partial rotation on their axes to expose the remaining pockets. Then the inner race ring, retainers, rollers and split ring are all turned a quarter turn around an axis 30, 32 to bring them into parallelism with the outer race ring. The split ring then snaps into its groove and thereafter holds the parts from cocking back to a position which will release the rollers. It will be understood that either the inner race ring, the outer race ring or both may be given the described relative swinging movement to effect assembly.

I claim:

1. An antifriction bearing comprising co-operating race-members, one of which has race-ways defining the zone of a sphere and also has a groove around it opening upon such race-way face, two rows of rolling-elements between said race-members, a retainer for the rolling-elements and having portions at the outward faces of the latter, and a resilient ring received in said groove and projecting between said rows; substantially as described.

2. An antifriction bearing comprising a race-member which has race-ways defining the zone of a sphere and also has a groove around it opening upon such race-way face, a second race-member having two race-grooves, a row of elongated rolling elements in each of said race-grooves, a retainer for the rolling-elements and having portions at the outward faces of the latter, and a resilient ring received in said groove in said first-mentioned race-member and projecting between said rows; substantially as described.

3. An antifriction bearing comprising an outer race-member whose race-surface defines the zone of a sphere, said race-member also having around it a groove opening upon said race surface, two rows of barrel-shaped rollers co-operating with said race-surface, an inner race-member having race-grooves receiving said rollers, a retainer for each of said rows and having a body between said inner race-member and the axes of rolling of said rollers and provided with openings receiving said rollers, and a resilient ring in said groove in said outer race-member and projecting between said rows; substantially as described.

4. An antifriction bearing comprising co-operating race-members, one of which has race-ways defining the zone of a sphere and also has a groove around it opening upon such race-way face, two rows of rolling-elements between said race-members, a retainer for the rolling elements and having its body portion upon that side of the axes of rolling of the latter that is removed from said sphere-defining race-member, said retainer having portions at the outward faces of said rolling-elements, and a resilient ring received in said groove and projecting between said rows; substantially as described.

5. In an antifriction bearing, co-operating race-members one of which has race-ways defining the zone of a sphere and also has a groove around it between said raceways and opening upon such race-way face, two rows of elongated rolling-elements between said race-members, the portions of each said race-member upon the outer sides of said rolling-elements being free from projections that extend beyond the race-way curvature and toward the co-operating race-member, a retainer whose body portion lies upon that side of the axes of the rolling-elements that is away from said sphere-defining race-way face, said retainer having spaces receiving said rolling-elements and also having portions extending over the ends of said rolling-elements, and a resilient ring received in said groove and projecting therefrom, whereby, for assembling, with the said sphere-defining race-member displaced with respect to its said co-operating race-member and the said retainer and ring about said co-operating race-member, said rolling-elements can be dropped into said retainer spaces, and after the race-members have been relatively swung to operative position with said ring in said groove the said retainer portions over the ends of said rolling-elements prevent the latter from falling out of the bearing; substantially as described.

In testimony whereof I hereunto affix my signature.

HAROLD R. GIBBONS.